June 22, 1965        D. DOW        3,190,387
ELECTRIC DRIVE MECHANISM AND METHOD OF OPERATING SAME
Filed Aug. 10, 1962        3 Sheets-Sheet 1
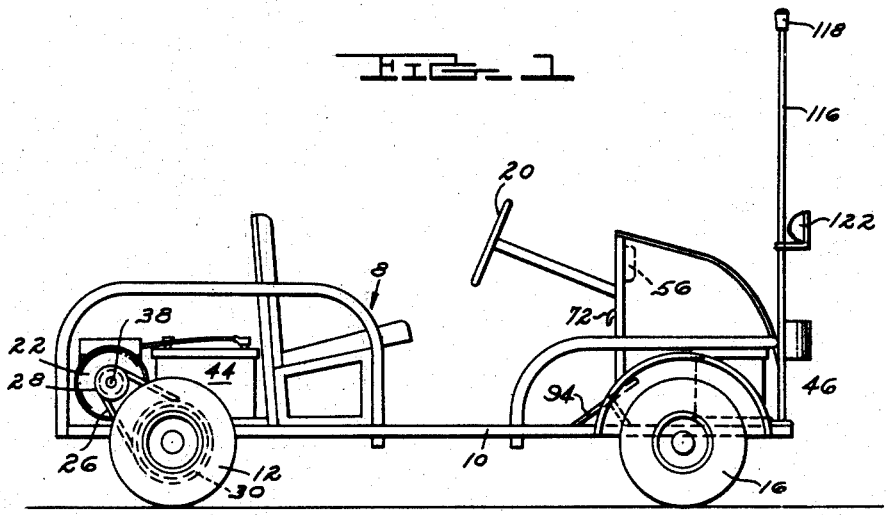
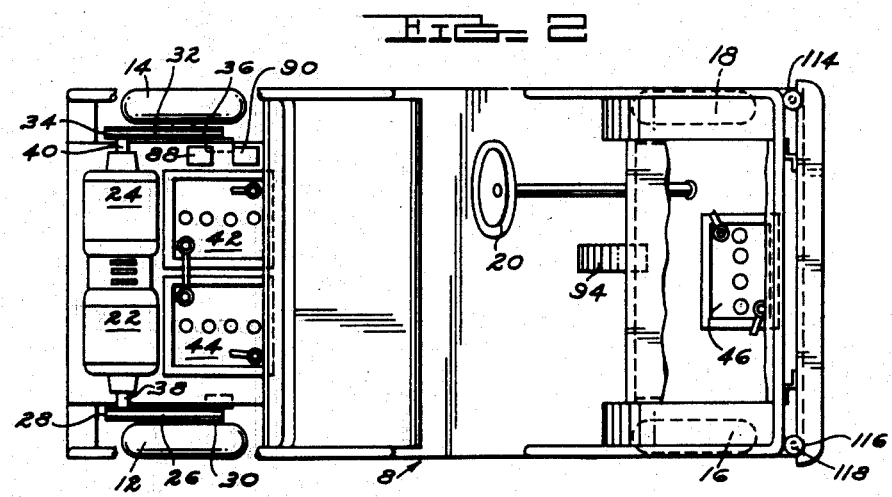
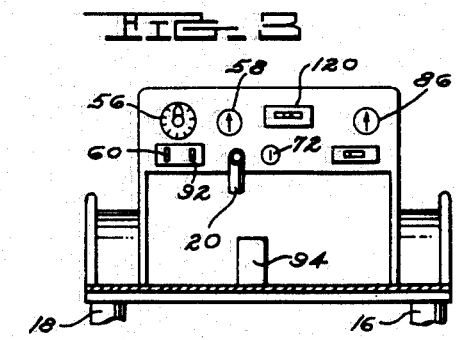
INVENTOR.
DOUGLAS DOW
BY
Burton & Parker
ATTORNEYS INVENTOR.
DOUGLAS DOW
BY
Burton & Parker
ATTORNEYS

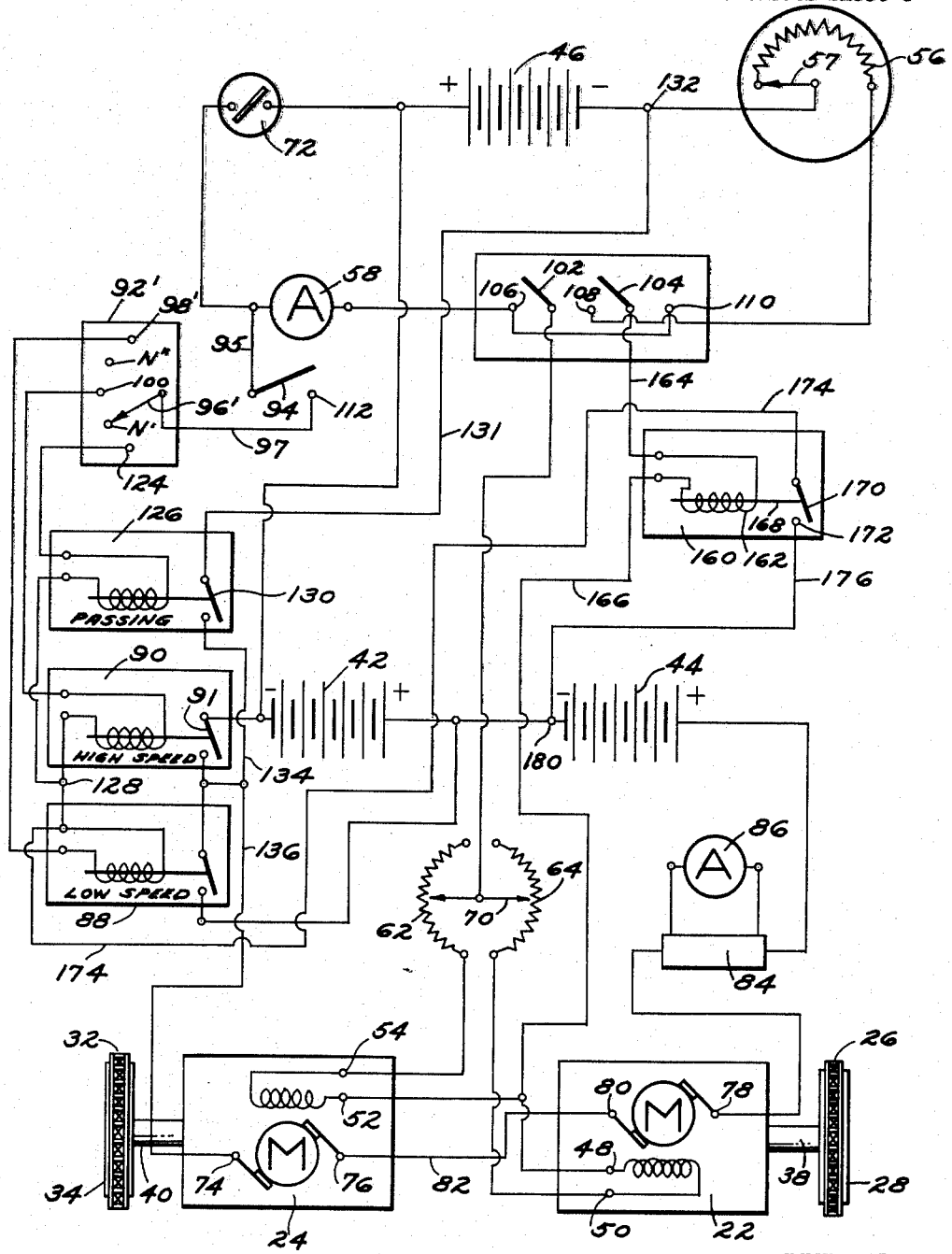

United States Patent Office 3,190,387
Patented June 22, 1965

3,190,387
ELECTRIC DRIVE MECHANISM AND METHOD
OF OPERATING SAME
Douglas Dow, 1052 Seminole St., Detroit, Mich.
Filed Aug. 10, 1962, Ser. No. 216,240
9 Claims. (Cl. 180—65)

This invention relates to improvements in electric drive mechanism and method of operating same; the invention having particular, though not exclusive utility in the propulsion of land vehicles. This application is a continuation-in-part of my co-pending application Serial No. 130,272 filed August 9, 1961.

More particularly the invention relates to an electric drive mechanism comprising a direct current motor and battery assembly, or other portable source of relatively limited electrical energy. While the invention would have utility in propulsion of vehicles obtaining the necessary electrical energy from a trolley, third rail, internal combustion engine and generator set, nuclear reactor generator, etc., it is particularly adapted for use with batteries, fuel cells or the like in which the available energy is relatively limited and decreases with the length of use.

The invention comprises a rotary electric direct current motor connected in such fashion to its source of electrical energy that the advantages of the series type and shunt type motors are obtained without the disadvantages of each. For example, the motor has a high starting torque, similar to a series motor, but without the tendency of a series motor to slow down with a slightly increased load, and without the jerk attendant with a series motor upon changing the impressed voltage. Further, the motor has a relatively constant speed characteristic under varying load conditions similar to a shunt motor, but without the low torque starting characteristics of a shunt motor. Unlike the series motor the voltage impressed on the armature may be increased by large increments without the necessity of heavy switch gear and without the attendant jerk as the motor increases in speed. The arrangement is such that the motor draws a relatively low current at the time it is started under a load, and for this reason the invention is particularly suitable for use with the fuel cell whose current output is limited, and which unlike the conventional lead-acid or nickel-cadmium battery cannot furnish large amperages for short periods.

Another advantage of my improved electric drive mechanism is that the circuitry connecting the field circuit to the battery or other source of E.M.F. is such that the field may be operated at its peak efficiency or, in other words, close to its saturation point. Further, because of the circuitry connecting the motor to the source of E.M.F. the problems of arcing between switch points, the heavy surges of current and high induced voltages attendant upon opening and closing of the motor circuits are substantially avoided.

To accomplish the aforementioned desirable results the field circuit of the motor is energized from an entirely separate source of electrical energy than is the armature and the armature and field are controllable independently of one another, with the field being energized prior to energization of the armature, and being continuously energized during interruptions in the armature circuit to effect speed changes. As a result of this the motor is capable of operating at a peak efficiency under widely varying load conditions, the switching and control of the motor may be made simple and economical, and the drive lends itself to regenerative braking through charging of the batteries.

With my improved drive connected to a road-driving wheel of a land vehicle it is a further object of the vehicle may be varied by connecting serially in the armature circuit a varying number of cells while uninterruptingly maintaining the field circuit energized.

A further advantage of my improved drive resides in the ability to accommodate varying road conditions (such as concrete, dirt, gravel, or soft ground) by varying the voltage impressed across the fielding winding.

During normal operation of the drive mechanism, the excitation of the field circuit is electrically independent of the excitation of the armature circuit, and during such operation the aforementioned advantages of my invention may be realized. When the drive mechanism is incorporated in an automotive type vehicle it may be desirable at times, for example when the driver of the vehicle wishes to pass an overtaken vehicle, to provide an increased burst of speed of relatively short duration. This may be accomplished by serially connecting in the armature circuit the normally independent sources of E.M.F. for the field and armature circuits, thereby temporarily increasing the armature circuit voltage. Under such condition the drive mechanism operates as a shunt field motor. As the amperage drain on the sources of E.M.F. is high during this passing period, it is not intended that the drive mechanism be operated for any but relatively short periods with this circuit arrangement, and that as soon as the overtaken vehicle is passed, the passing circuit be disconnected so that continued operation will be with separately excited field and armature circuits.

Other objects, advantages and meritorious features will more fully appear from the specification, claims and accompanying drawings wherein:

FIG. 1 is a side elevation of an illustrative embodiment of a land vehicle with which my improved electric drive assembly may be used;

FIG. 2 is a top view of the vehicle of FIG. 1;

FIG. 3 is a view of the dashboard of the vehicle;

FIG. 5 is a schematic diagram of the vehicle of FIGS. 1–3 with an auxiliary engine-generator set mounted on a trailer detachably connected to the rear end of the vehicle; and FIG. 6 is a schematic wiring diagram of a preferred embodiment of my electric drive assembly which differs from the disclosure of FIG. 4 in providing for a passing speed.

Figure 4:
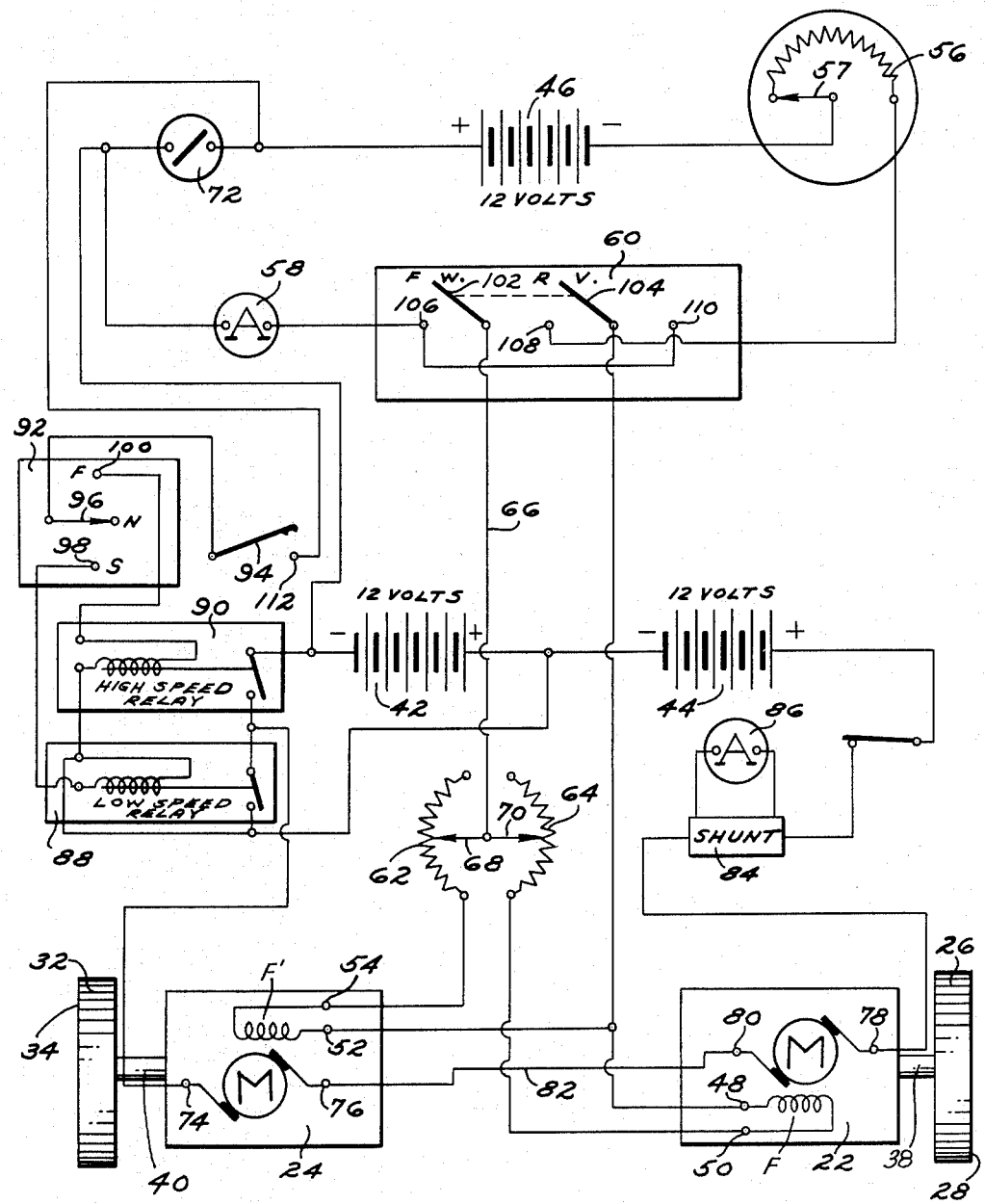
FIG. 4 is a schematic wiring diagram of an illustrative embodiment of my improved electric drive assembly.

As above mentioned the drive mechanism disclosed herein is particularly well suited for use in an electric automobile or the like. An illustrative embodiment of such vehicle is shown in FIGS. 1–3 at 8 as including a frame 10 suitably supported on road wheels 12, 14, 16 and 18 of which 12 and 14 are driving wheels. Wheels 16 and 18, through suitable steering mechanism, including a steering wheel 20, guide the direction of the vehicle. Each driving wheel is driven by its own direct current reversible motor, namely motors 22 and 24, through any suitable mechanism such as a chain 26 and sprockets 28 and 30 for motor 22 and a chain 32 and sprockets 34 and 36 for the motor 24. Sprockets 28 and 34 are mounted on the armature shafts 38 and 40 of the motors to be driven by and to drive the same. Sprockets 30 and 36 are connected to the driving wheels to drive and be driven by the same. The chains are entrained over the sprockets.

In lieu of two motors one might be used with a suitable differential drive between it and the road wheels 12 and 14. The same principles hereinafter discussed apply whether one or two motors are involved.

The field windings of the motors are connected to one source of electric energy, and the armature windings of the motors are connected to another and electrically independent source of electrical energy, with the voltage impressed upon the field windings and the voltage impressed upon the armature windings being independently variable. Hereinafter reference is frequently made to a battery or batteries. This term or terms is used generically to indicate a source of D.C. electrical energy, such as the conventional lead-acid or nickel-cadmium battery or a fuel cell. In essence the field windings are connected to a field battery and the armature windings to an armature battery with the batteries and connections provided between them being such that during normal operation of the vehicle, that is during reverse, low and high speed operation, the field and armature circuits and their batteries are electrically independent with the only interconnection being effected for purposes of "passing speed" where the field and armature batteries may be serially connected together in series with the armature windings.

For purposes of suitable weight distribution the motors 22 and 24 may be mounted at the rear of the vehicle adjacent the driving wheels 12 and 14. Just ahead of these motors are a plurality of cells comprising one source of electrical energy. Such cells may comprise a pair of batteries 42 and 44 which supply electrical energy for the armature windings of the motors 22 and 24. These batteries may be of the conventional lead-acid type, or the newer nickel-cadmium type battery, or might be replaced by fuel cells, or other suitable source of electrical energy. As there is a relatively high amperage current between these batteries and the armature windings of the motors it is desirable that these batteries be placed close to the motors to keep the motor armature leads short. Mounted adjacent the front end of the vehicle over the guiding wheels 16 and 18 is another source of electrical energy, shown as in the form of a conventional lead-acid or nickel-cadmium type battery 46 consisting of a number of cells. As with the batteries 42 and 44, battery 46 may be replaced by fuel cells or other suitable source of electrical energy.

As mentioned above, each of the motors 22 and 24 includes a field winding and an armature winding. These two windings are so arranged that they are electrically independent of each other, that is to say the electrical energy which flows through the field winding does not thereafter flow through the armature winding, nor does part of the current which flows through the field winding flow through the armature winding, or vice versa. It is not intended to mean that there is no electro-magnetic coupling between the field and armature windings, which of course there is. However, apart from the latter the two circuits are independent of each other.

FIG. 4 shows motor 22 provided with a pair of field winding lead wire terminals 48 and 50 and motor 24 with a corresponding pair of terminals 52 and 54. These terminals are connected to opposite ends of the field windings F and F' of the respective motors. The field windings of the motors may be and are shown as connected together in parallel with the battery 46. However it is to be understood that they may be connected together in series with the battery. The field circuit in addition to the battery 46 and the field windings of each motor includes a field resistor 56 having a movable contact 57 shiftable from a position of high resistance to successive positions of decreased resistance to vary the voltage impressed upon the field windings, an ammeter 58, and a forward and reverse switch 60. A balancing resistor is also provided including a pair of individual resistances 62 and 64 each swept by a contact connected to lead 66 from the switch 60, the contacts being indicated at 68 and 70. The balancing resistance is used to initially balance the magnetic strength of the field windings between the two motors so that the counter electromotive forces thereof are equal. An "ignition key" switch 72 may be provided so that the vehicle can be "locked" when unattended.

The armature circuit for the motors which is normally electrically independent of the field circuit, includes terminals 74 and 76 at opposite ends of the armature winding for the motor 24 and terminals 78 and 80 at opposite ends of the armature winding for motor 22. Lead 82 connects together terminals 76 and 80 so that the armature coils of the motors are connected in series. The armature circuit also includes a shunt 84 across which is connected a meter 86 for reading the amperage in the armature circuit. Switch means in the form of a pair of relays 88 and 90 together with a speed control switch 92 and an off-on, or what might be termed "accelerator" switch 94, serve to vary the voltage impressed across the armature windings by virtue of connecting battery 44 only in the armature circuit, or both batteries 42 and 44 in series in the armature circuit. With battery 44 only connected twelve volts in the illustrative embodiment shown in FIG. 4 would be impressed across the armature windings. With battery 42 connected serially with battery 44, twenty-four volts would be impressed across the armature windings.

With the movable contact 96 of the speed control switch 92 at the position shown, closure of switch 94 will fail to excite the armature windings, however with contact 96 touching contact 98, relay 88 is energized thereby serving to connect battery 44 alone in series with the armature windings. With contact 96 touching contact 100, batteries 42 and 44 are serially connected to the motor armatures to increase the voltage impressed across the armature windings. By tracing through the circuitry shown, the above arrangements will be found to exist.

In order to start the vehicle from rest, the key switch 72 is closed. Switch 60 is manipulated to position its contacts 102 and 104 either for forward or reverse operation of the vehicle, respectively, either touching contacts 106 and 108 or touching contacts 108 and 110. The movable contact 57 of resistor 56 is moved to impress a voltage across the field windings of the motors. After the magnetic field surrounding the field windings has had an opportunity to build up, which will occur very rapidly, contact 96 of the speed control switch is moved to touch either contact 98 or 100 and contact 94 is moved to touch contacts 112. The electro-magnetic reaction between the armature and field in the well known fashion serves to turn the armature and thereby drive the vehicle. Once the vehicle is up to speed the field resistor may be adjusted to provide the most efficient operation of the system.

By virtue of having the field windings excited prior to the armature windings from a source of electrical energy unaffected by the energization of the armature windings, a number of positive advantages result, some of which are as follows:

(1) The high current drain on the batteries is not as prolonged as with a series or shunt motor;

(2) The acceleration is smooth and rapid;

(3) The motors may be energized from sources of electrical energy not having high amperage output capabilities, such as the fuel cell;

(4) A high starting torque is provided;

(5) The switch gear or armature circuit controllers may be less complicated as armature voltages may be increased or decreased in larger steps than with a shunt or series motor without the attendant jerkiness of operation; and (6) The switch contact points in the armature and field circuits may be lighter as the arcing therebetween is minimal.

These advantages result because the armature current drain on the armature battery does not affect the impressed voltage on the field supplied by the field battery, and as the field flux is at constant pre-selected strength, rotation of the armature winding in such flux yields the maximum counter electromotive force at every instant during acceleration of the armature to reduce the armature current. Also, the torque is high because of the constant strength of the field flux.

By exciting the armature and field windings from separate batteries the disadvantageous starting and accelerating characteristics of battery-powered shunt motors are avoided. In the shunt motor, upon applying a voltage either for starting or acceleration, the heavy inrush of current to the armature depletes the available supply of ions at the electrodes of the battery with a resulting drop in terminal voltage of the battery. This reduces the voltage applied to the field of the shunt motor and as a consequence reduces the field current, flux, and torque, just when torque is most needed, and allows a prolongation of the high current drain on the battery. Therefore my improved system where the field flux is unaffected by the inrush of current to the armature windings, will reduce the amount of electric energy expended by the armature batteries, and for that matter the field batteries, as the vehicle accelerates from a standstill, or as it accelerates between speed changes during its motion.

Also it will be noted, the field circuit is not interrupted during changes in the voltage impressed across the armature windings during operation of the vehicle. When the speed control switch 92 is shifted to bring movable contact 96 into engagement with contact 100, and thereby serially connect batteries 42 and 44 with the motor armatures, the field circuit remains unbroken. By continuously energizing the field winding the magnetic field established by the field winding is present throughout the interruptions of the armature current and when battery 42 is connected serially with battery 44, or during a "down shift" when battery 42 is disconnected from the armature circuit, or when the operator lifts his foot from the "accelerator" 94 to allow the vehicle to coast, or depresses the "accelerator" to again energize the armature circuit, and as a result the high armature currents associated with series and shunt motors when they are connected and disconnected from their power circuits, are avoided. Consequently relatively lighter switches may be used in the armature circuit, arcing between contact points is reduced, complex multi-point armature circuit controllers are eliminated, as well as controllers for field windings, and of interest to the passengers, acceleration is smooth and rapid and satisfying without the jerkiness attendant with other systems of electric drives. This response to increased or decreased armature voltage gives superior performance for safe driving in traffic.

A regenerative braking effect is also obtained whenever the speed of the vehicle is such that the counter electromotive force exceeds the voltage of the armature battery or batteries. This is frequently obtained on a downgrade or during a downshifting from a series connection of batteries 42 and 44 to a connection of only battery 44 in the armature circuit. Of course the foot switch 94 must be closed to obtain the regenerative braking effect.

I have found that the requirements or performance desired from an electric drive for an automotive type vehicle are best met by the system disclosed herein where variable torque requirements involved in acceleration and varying speed may be accomplished by varying the voltage applied to the armature while the variable torque requirements resulting from changes in soil or pavement conditions, steep grades (ramps, etc.) are best met by changing the flux strength of the field windings. The additional torque required by hills is similar to that required by acceleration and is due to the necessity of overcoming the gravity, or acceleration due to gravity, upon the mass of the vehicle.

The dashboard for the vehicle shown in FIGS. 1 and 2 is illustrated in FIG. 3 where the variable field resistor is indicated at 56, the forward and reverse switch at 60, the field circuit ammeter at 58, the armature circuit ammeter at 86, the key switch at 72 and the speed control switch at 92. The "accelerator" switch at 94 is mounted on the toeboard of the vehicle for operation by the driver's foot.

Combination turn signals and warning lights are mounted on a pair of upright poles 114 and 116 at the forward end of the vehicle. Such lights, such as light 118 shown in FIG. 1, are mounted atop the poles. The lights may be connected in a conventional turn signal flashing circuit, the switch for which is shown on the dashboard in FIG. 3 at 120. The lights, such as light 118, are elevated sufficiently above the road so as to be readily visible from other vehicles. Suitable headlights or the like may also be mounted on the poles as indicated at 122.

FIG. 6 is basically the same as FIG. 4 with the addition of a "passing gear" or passing speed circuit for enabling the vehicle driver to serially connect together batteries 42, 44 and 46 in the armature circuits of the motors 22 and 24 for the purpose of impressing the highest voltage across the armature windings to provide thereby a passing speed of maximum acceleration and speed for short intervals of time. FIG. 6 also discloses an interlocking relay for a purpose to be described. Because the circuit of FIG. 6 differs from that of FIG. 4 principally only in the addition of certain circuit components, either the same or primed reference numerals are used for corresponding components appearing in FIG. 4.

In FIG. 6 switch 92' corresponds generally with switch 92 of FIG. 4 differing therefrom only in that there are two neutral or dead positions N' and N" for movable contact 96', rather than only one, viz. N in FIG. 4, and a third fixed contact 124 has been added which may be engaged by movable contact 96'. In addition to the high and low speed relays of FIG. 4, the FIG. 6 circuit includes a third relay 126 which may be termed a "passing relay" whose solenoid is connected at one end to contact 124 and at the opposite end, as at 128, to the common sides of relays 88 and 90 and thus in the circuit of battery 42. The armature of relay 126 is connected to switch 130, one side of which is connected by a suitable conductor 131 to the negative side of battery 46 at 132, while the other side of switch 130 is connected to conductor 134 which is in turn connected to the armature circuit of the motors 22 and 24 as at 136.

The "passing gear" is preferably operated in the following manner. During high speed travel of the vehicle, that is when movable contact 96' is in engagement with contact 100 and the foot pedal switch 94 is closed against contact 112 and the vehicle is travelling at normal top speed, should the driver desire to attain maximum speed for passing or similar purposes, swicth 92' is operated to advance movable contact 96' from its engagement with contact 100, through the neutral or dead position N', to the passing speed contact 124. This serves to de-energize relay 90 and open its associated switch 91, and energize the solenoid of relay 126, thereby closing its associated switch 130. Upon closure of switch 130, batteries 42, 44 and 46 are serially connected together in the armature circuits of the motors 22 and 24 and the maximum voltage is impressed across the armature windings of the motors. This serves to accelerate the vehicle to maximum speed. The field circuit will continue to be uninterruptedly energized only by the field battery 46. It is not recommended that the vehicle be driven any appreciable distance in the "passing speed" as such results in an increased drain on the field battery. As mentioned, this "passing speed" is utilized only during high speed operation of the vehicle, i.e., when the vehicle is already operating at normal top speed. Should the "pass speed" circuit be utilized from an at rest condition of the vehicle, the usual disadvantages of a battery excited shunt field motor cited above would be experienced.

Preferably the field windings resistances of the motors are of a high order in relation to the resistances of the armature windings, such as 2:1 or greater, and I have found that a ratio of 100:1 is very satisfactory.

In view of the above it will be apparent to those skilled in the art that switch 92' of FIG. 6 or 92 of FIG. 4 may be provided with additional fixed contacts and additional relays may also be included whereby additional batteries or cells may be connected in the circuits to provide either a greater speed range or smaller increments or steps in the voltages applied to the motor armature. In any such arrangement however, the contact 124 would be arranged so that it would be at the end of the series whereby the passing speed would not be utilized until all of the batteries or cells normally connected in the armature circuit for high speed operation had been previously connected therein so that the vehicle was operating at normal top speed before the passing speed was operated.

For purposes of analogy to a conventional manually shifted internal combustion engine powered vehicle, the switch 92 or 92′ may be likened to the gear shift lever while the foot switch 94 may be likened to the accelerator pedal. Of course when the pedal is raised in a vehicle employing the herein disclosed system, the vehicle will coast without any drag of the motors, unlike most conventional vehicles of today which will be slowed by the drag of the engine when the accelerator is lifted. The effect of lifting the pedal is similar to the "free wheeling" systems found in certain older vehicles having an "overdrive." In the event free wheeling is not desired, or it is wished to simplify the control by combining the "gear shift" and accelerator to provide an "automatic shift" type vehicle, switches 92 or 92′ and 94 may be combined. This is simply accomplished by eliminating altogether switch 94 and directly connecting together leads 95 and 97. Switch 92 or 92′ may be removed from the dashboard to the toeboard of the vehicle to be operated by an "accelerator pedal." A spring-return device may be connected to movable contact 96 and 96′ whereby upon release of the accelerator pedal the movable contact is moved to a dead position out of contact with any fixed contact operative to drive the vehicle. In lieu of switches 92 and 92′ a plunger switch of the type generally disclosed in the co-pending application Serial No. 82,114, filed January 11, 1961, now Patent No. 3,137,774, issued June 16, 1964, may be utilized. The details necessary to effect such changes will be obvious to those skilled in the art and need not be further described.

To insure that the armature of motors 22 and 24 cannot be energized until after the fields have been excited, an interlocking relay 160 is provided as shown in FIG. 6. The relay includes a magnet coil 162 in series with the field circuits. More specifically one end of the coil is connected by lead 164 to movable contact 104 while the opposite end of the coil is connected by lead 166 to a point common to points 48 and 52 in the field circuit. Therefore upon closing of contact 104 against either contact 108 or 110 to energize the field circuits of the motors, coil 162 will be energized.

Relay 160 includes a plunger 168 connected to a movable contact 170 such that upon energizing coil 162 the plunger is shifted to close contact 170 against fixed contact 172 to complete a circuit between leads 174 and 176. Lead 174 is connected to the common sides of the coils of relays 88, 90 and 126 as shown. Lead 176 is connected to a point 180 common to the positive and negative sides of batteries 42 and 44 as shown in FIG. 6. In consequence of this arrangement lead 174 is not energized to energize the relay 88, 90 or 126 to energize the armatures of motors 22 and 24 until after coil 162 has been energized which occurs upon energization of the field circuits of the motors. The advantage of this arrangement is that it insures the build up of the field flux in the motors which will limit the current in the armature windings of the motors when the armature circuits are energized, thereby preventing a suddden rush or high amperage of current in the armature circuits that would tend to deplete the batteries when the armature circuits are first energized.

FIG. 5 discloses an arrangement whereby the operating range of the vehicle may be extended, and in the absence of a commercial source of electrical energy for charging the batteries, may provide for such charging. The arrangement includes a trailer 150 detachably connected to the rear of vehicle 8 and upon the road wheel supported frame of which is mounted a standard 115 volt alternating current engine-generator set 152 of the type readily available commercially, including an internal combustion engine 154 or the like drivingly connected to a generator 156. The generator may be detachably connected through suitable leads to transformer and rectifier circuits (not shown) for charging each of the batteries 42, 44 and 46 simultaneously or separately. The transformer and rectifier equipment is preferably mounted on the vehicle.

To extend the operating range of the vehicle, the engine 154 is started and operated during operation of the vehicle. The size of the engine is such in relation to the generator, and the generator output is such in relation to the current drain on the batteries that during uniform speed of the vehicle on level ground the generator will just slightly charge the batteries. During acceleration and hill climbing the battery drain will exceed the generator output.

When the trailer and generator set are not needed to extend the range of the vehicle, the unit can also be used as an emergency source of electric energy for the home suitable for operating essential electrical devices during power interruption.

What is claimed is:

1. In a variable speed electric drive assembly for driving a variable load and adapted to be energized by electrochemical sources of direct current energy: a direct current current motor for connection to the variable load to drive or be driven by the same and having a high resistance field winding and a relatively low resistance armature winding; a pair of electrically independent electrochemical sources of direct current at least one of which is rechargeable; an armature circuit including the armature winding and the rechargeable one of said pair of sources of current electrically connected together; a field circuit electrically and operably independent of the armature circuit including the field winding and the other of said sources of current electrically connected together; said rechargeable source of current comprising a serially connected plurality of electro-chemical cells; one end of said serially connected plurality being connected to one side of said armature winding, switch means for connecting the other side of said armature winding into said plurality of serially connected cells at various points to vary the number of such cells which are serially connected across the armature winding; and said field winding connected to its source of current in the field circuit for uninterrupted energization of the field winding during all variations in the voltage of the armature circuit.

2. The invention as defined in claim 1 characterized in that: the electric drive is mounted on a self-propelled vehicle having a driving wheel and the motor is connected to said wheel to drive or be driven by the same, and said armature circuit being operative to effect regenerative braking of said road wheel and charging of said rechargeable source of current when the counter electromotive force in the armature winding exceeds the voltage of said rechargeable source of current.

3. The invention as defined in claim 1 characterized in that the electric drive is mounted on a self-propelled vehicle having a driving wheel and the motor is connected to said wheel to drive or be driven by the same, and mechanism is provided for controlling the energization of both the field and armature circuits, such mechanism including said switch means for the armature circuit and switch means in the field circuit between the field winding and its respective source of current, said mechanism operable to energize the field winding prior to and continuously during energization of the armature winding.

4. The invention as defined in claim 3 characterized in that said switch means in the field circuit is operable to vary the voltage impressed on the field winding without interrupting energization of the field winding.

5. The invention as defined in claim 1 characterized in that the electric drive is mounted on a vehicle having a pair of driving wheels and there are a pair of said motors, one connected to each wheel to drive or be driven by the same, and the armature windings of said motors are connected together in series.

6. The invention as defined in claim 1 characterized in that the field winding is connected to its source of current for operation normally substantially at its point of saturation.

7. The invention as defined in claim 1 characterized in that means are provided connected in the armature and field circuits for successively connecting the field winding to its source of current and the armature winding to its source of current and maintaining the field winding continuously energized during variations in the armature voltage.

8. The invention as defined in claim 1 characterized in that means are provided in the field circuit for varying the voltage applied to the field winding.

9. The invention as defined in claim 1 characterized in that switch means are provided connected in the armature and field circuits for temporarily connecting, without interrupting the field circuit, the said pair of sources of current in series in the armature circuit to provide maximum voltage across the armature windings.

References Cited by the Examiner
UNITED STATES PATENTS

| | | | |
|---|---|---|---|
| 549,061 | 10/95 | Dunn | 318—405 X |
| 632,874 | 9/99 | Leitner. | |
| 691,473 | 1/02 | Limb | 191—4 |
| 992,682 | 5/11 | Muller. | |
| 1,291,233 | 1/19 | Storer. | |
| 1,551,400 | 8/25 | Jones | 318—493 X |
| 2,586,273 | 2/52 | Steven | 180—60 X |
| 2,706,008 | 4/55 | Voigt | 180—65 X |

FOREIGN PATENTS 23,505    1/01    Switzerland.

PHILIP ARNOLD, *Primary Examiner.*

A. HARRY LEVY, *Examiner.*

UNITED STATES PATENT OFFICE
CERTIFICATE OF CORRECTION

Patent No. 3,190,387

June 22, 1965

Douglas Dow

It is hereby certified that error appears in the above numbered patent requiring correction and that the said Letters Patent should read as corrected below.

Column 1, line 72, after "object" insert -- of the invention to provide circuitry whereby the speed --; column 2, line 7, for "fielding" read -- field --; column 6, line 46, for "swicth" read -- switch --; column 7, line 41, for "armature" read -- armatures --; line 57, after "shown" insert a period.

Signed and sealed this 26th day of October 1965.

(SEAL)
Attest:

ERNEST W. SWIDER
Attesting Officer

EDWARD J. BRENNER
Commissioner of Patents

Disclaimer 3,190,387.—*Douglas Dow*, Detroit, Mich. ELECTRIC DRIVE MECHANISM AND METHOD OF OPERATING SAME. Patent dated June 22, 1965. Disclaimer filed Dec. 17, 1965, by the inventor.

Hereby disclaims the terminal portion of said patent subsequent to May 11, 1982.

[*Official Gazette February 8, 1966.*]